United States Patent
Strein et al.

(10) Patent No.: US 12,368,677 B2
(45) Date of Patent: Jul. 22, 2025

(54) DUAL INTERNET PROTOCOL (IP) NETWORK INPUT REFERENCE VALIDATION

(71) Applicant: Disney Enterprises, Inc., Burbank, CA (US)

(72) Inventors: Michael J. Strein, Bohemia, NY (US); Guy W. Beverlin, Salt Lake City, UT (US); Nigel Brownett, Long Beach, CA (US); Eric F. Pohl, New York, NY (US); David E. Potter, Altadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 285 days.

(21) Appl. No.: 18/045,110

(22) Filed: Oct. 7, 2022

(65) Prior Publication Data
US 2024/0121198 A1    Apr. 11, 2024

(51) Int. Cl.
*H04L 43/0817*  (2022.01)
*H04L 47/2416* (2022.01)
*H04L 47/32*   (2022.01)
*H04L 65/65*   (2022.01)

(52) U.S. Cl.
CPC ...... *H04L 47/2416* (2013.01); *H04L 43/0817* (2013.01); *H04L 47/32* (2013.01); *H04L 65/65* (2022.05)

(58) Field of Classification Search
CPC . H04L 47/2416; H04L 43/0817; H04L 47/32; H04L 65/65; H04L 43/50
USPC ......................................................... 709/231
See application file for complete search history.

(56) References Cited

U.S. PATENT DOCUMENTS

| | | | |
|---|---|---|---|
| 7,310,306 B1* | 12/2007 | Cheriton | H04L 49/30 370/220 |
| 7,391,765 B2* | 6/2008 | Tezuka | H04L 47/2416 370/429 |
| 10,334,322 B1* | 6/2019 | Seddon | H04L 65/752 |
| 10,439,879 B2 | 10/2019 | Dhesikan et al. | |
| 10,873,533 B1* | 12/2020 | Ismailsheriff | H04L 47/27 |
| 10,958,564 B1* | 3/2021 | Asthana | H04L 45/20 |

(Continued)

OTHER PUBLICATIONS

S. Fiorino, "Compliance and Performance Testing for a MoIP System," Dated May 18, 2020, pp. 1-4.

(Continued)

*Primary Examiner* — Karen C Tang
(74) *Attorney, Agent, or Firm* — Farjami & Farjami LLP

(57) ABSTRACT

Embodiments provide systems and techniques for testing the functionality of a network architecture having multiple redundant internet protocol (IP) networks. An example system includes a first IP network having a first network device, and a second IP network having a second network device. The system also includes a computing device coupled to the first IP network via the first network device and to the second IP network via the second network device. The first network device is configured to selectively forward first packet(s) of the IP media traffic flow to the computing device when the first packet(s) satisfies a first predetermined condition. The second network device is configured to selectively forward second packet(s) of the IP media traffic flow to the computing device when the second packet(s) satisfies a second predetermined condition.

16 Claims, 11 Drawing Sheets

(56) References Cited

U.S. PATENT DOCUMENTS

| | | | |
|---|---|---|---|
| 2010/0271488 A1 | 10/2010 | Garcia et al. | |
| 2012/0019668 A1 | 1/2012 | Seth-Smith et al. | |
| 2012/0191270 A1* | 7/2012 | Floyd | B60Q 1/305 |
| | | | 701/2 |
| 2013/0339538 A1* | 12/2013 | Gintis | H04L 43/50 |
| | | | 709/231 |
| 2015/0026542 A1* | 1/2015 | Brennum | H04L 65/764 |
| | | | 714/776 |
| 2015/0188722 A1* | 7/2015 | Bhagavathiperumal | |
| | | | H04L 47/125 |
| | | | 370/235 |
| 2016/0057061 A1* | 2/2016 | Avci | H04L 43/50 |
| | | | 370/235 |
| 2018/0234473 A1* | 8/2018 | Levi | H04L 49/90 |
| 2020/0236025 A1 | 7/2020 | Overton | |
| 2020/0280576 A1* | 9/2020 | Key | H04L 63/20 |
| 2023/0114898 A1* | 4/2023 | Kamisetty | H04L 47/2441 |
| | | | 370/235 |

OTHER PUBLICATIONS

Author Unkown, "IP (Layer 3) Testing," GL Communications Inc., Year: 2022, pp. 1-7.

Author Unknown, "QxL: Addressing the Needs of Professional Broadcase Media IP networks in a compact form factor," PHABRIX Ltd, Year: 2021, pp. 1-93.

M. Wong et al., "Testing Compilers for Programmable Switches Through Switch Hardware Simulation," New York University, Dated: Oct. 27, 2020, pp. 1-7.

"ST 2022-7:2019—SMPTE Standard—Seamless Protection Switching of RTP Datagrams," in ST 2022-7:2019, Dated:May 13, 2019, pp. 1-11.

* cited by examiner

DUAL INTERNET PROTOCOL (IP) NETWORK INPUT REFERENCE VALIDATION

BACKGROUND

Media facilities generally employ internet protocol (IP) networks that are able to receive, process, forward, and generate IP media traffic flows, such as media-over-IP multicast production media traffic flows. The IP media traffic flows may carry different types of media traffic, including, for example, video, audio, metadata, and combinations thereof. Because IP media production often involves latency sensitive traffic, such as live streaming video, media facilities generally assure delivery on IP networks by using multiple active transmission links to handle IP media traffic flows instead of either retransmission methods or active/passive failover systems. For example, a resilient architecture may incorporate multiple independent IP networks (often referred to as "Red/Blue" networks), where identical IP traffic follows multiple discrete paths (through the multiple independent IP networks) from the source to the destination. Such an architecture may allow for IP traffic to arrive intact at the destination in the event of a failure of one or more components along one of the paths. In order for the destination to operate in such a resilient architecture, the destination needs multiple distinct inputs (e.g., a respective network interface card for receiving IP traffic from each IP network). The destination can then receive IP traffic from both inputs. Such a network architecture design with multiple independent IP networks can pose challenges when testing the functionality and resiliency of the architecture.

SUMMARY

One embodiment described herein is a system for testing a functionality of a media network. The system includes a first internet protocol (IP) network, a second IP network, a first computing device, and a second computing device. The first IP network includes a first network device and is configured to forward an IP media traffic flow. The second IP network includes a second network device and is configured to forward the IP media traffic flow. The first computing device is coupled to the first IP network via the first network device and to the second IP network via the second network device. The second computing device is coupled to the first IP network via the first network device and to the second IP network via the second network device. The first computing device is configured to transmit the IP media traffic flow to the second computing device via the first IP network and the second IP network. At least one of: (i) the first network device is configured to selectively forward at least one first packet of the IP media traffic flow to the second computing device when the at least one first packet satisfies a first predetermined condition; or (ii) the second network device is configured to selectively forward at least one second packet of the IP media traffic flow to the second computing device when the at least one second packet satisfies a second predetermined condition. The at least one first packet is different from the at least one second packet.

Another embodiment described herein is a computer-implemented method performed by a controller for testing a functionality of a media network comprising a first IP network and a second IP network redundant to the first IP network. The computer-implemented method includes configuring at least one of (i) a first network device within the first IP network to selectively forward at least one first packet of an IP media traffic flow when the at least one first packet satisfies a first predetermined condition or (ii) a second network device within the second IP network to selectively forward at least one second packet of the IP media traffic flow when the at least one second packet satisfies a second predetermined condition. The at least one first packet is different from the at least one second packet. The computer-implemented method also includes performing a test of a functionality of a computing device to recover the IP media traffic flow from at least one of the first network device or the second network device.

Another embodiment described herein is a network device. The network device includes a processor and a memory containing a program that, when executed by the processor, performs an operation. The operation includes receiving a sequence of packets of an internet protocol (IP) media traffic flow. The network device is located within a first IP network of a plurality of redundant IP networks. The operation also includes, for each packet of the sequence of packets: (i) forwarding the packet upon determining that the packet satisfies a predetermined condition; and (ii) discarding the packet upon determining that the packet does not satisfy the predetermined condition.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Certain media networks may employ multiple IP networks to handle latency sensitive traffic. For example, in such media networks, IP media traffic (e.g., video stream, audio stream, metadata, and combinations thereof) may be sourced through redundant IP (Red/Blue) networks in order to protect the IP media traffic against data loss. In an exemplary media network, one or more devices (e.g. media nodes) may support a seamless switching protocol (e.g., Society of Motion Picture and Television Engineers (SMPTE) 2022-7), which allows (i) a source (e.g., media source) to send two IP media streams (with the same data) through two different paths to a destination (e.g., media endpoint) and (ii) the destination to recover the original IP media stream from the two IP media streams received from the two different paths.

Figure 1:
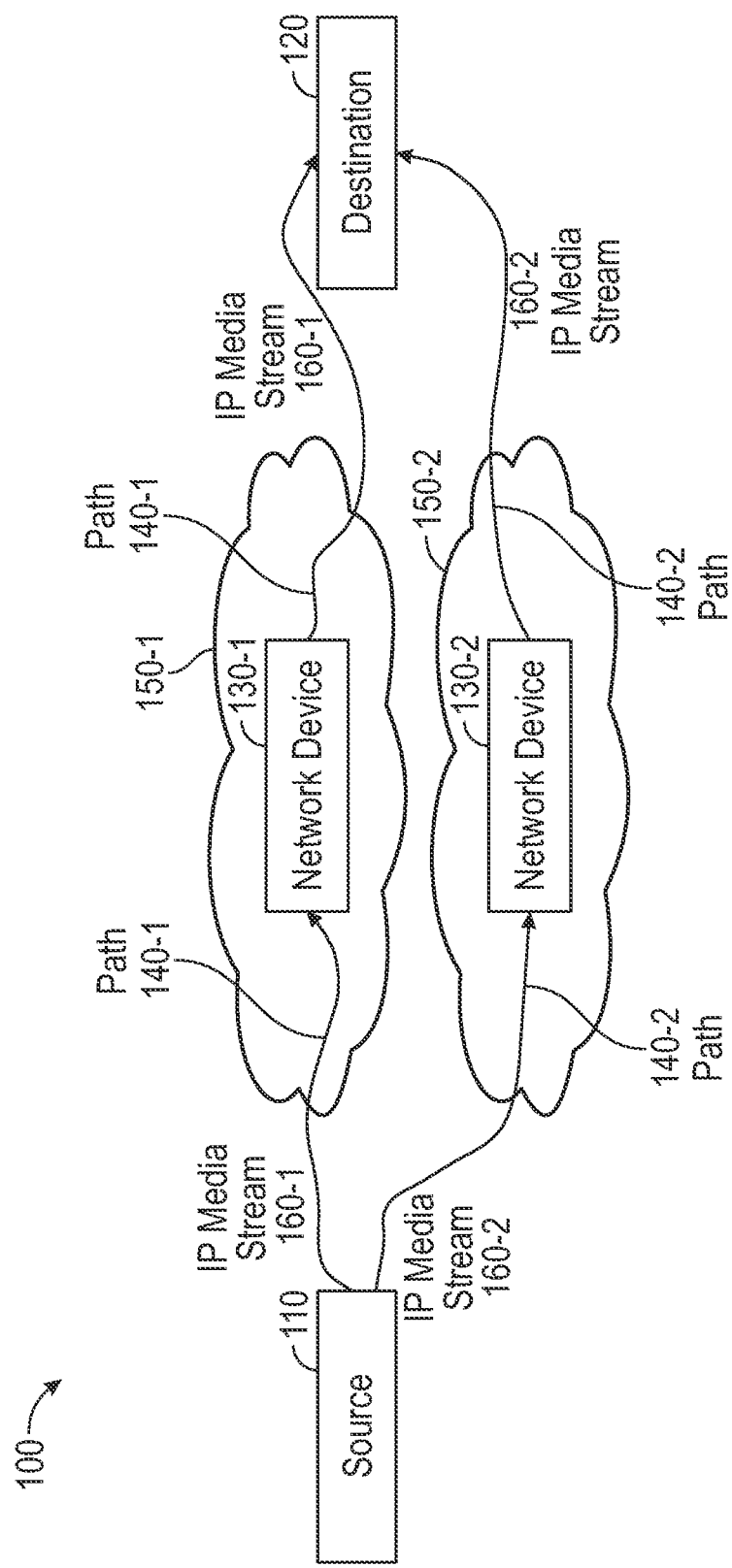
FIG. 1 illustrates an example scenario for seamless protocol switching.

Consider the reference scenario 100 depicted FIG. 1, which illustrates a source sending IP media traffic to a destination according to a seamless switching protocol, such as SMPTE 2022-7. Here, source 110 and destination 120 are SMPTE 2022-7 capable devices (e.g., source 110 and destination 120 support SMPTE 2022-7). In one example, the source 110 and destination 120 are media equipment (e.g., video cameras, microphones, headsets, media players, video editing hardware, etc.). The source 110 transmits an IP media stream 160-1 and an IP media stream 160-2 with the same data via two different paths to the destination 120. As shown, the source 110 transmits the IP media stream 160-1 via path 140-1 (including network device 130-1, e.g., an IP switch) in network 150-1 and transmits the IP media stream 160-2 via path 140-2 (including network device 130-2, e.g., an IP switch) in network 150-2.

The destination 120 may include two separate network interface card (NIC) interfaces to accept the IP media stream 160-1 from the path 140-1 and accept the IP media stream 160-2 from the path 140-2. The destination 120 may recover the original media stream from at least one of the path 140-1 or the path 140-2. For example, if a packet was lost on the path 140-1, then the destination 120 may obtain that packet from the path 140-2. Similarly, if a packet was lost on the path 140-2, then the destination 120 may obtain that packet from the path 140-1. In another example, if the path 140-1 completely fails (or is otherwise unavailable), then the destination 120 can obtain the entire stream from path 140-2, and vice versa. In this manner, the destination 120 may be able to accept packets from multiple paths in order to recover the original IP media stream without impact on the content of the IP media stream.

Conventional techniques for testing the functionality of devices and media networks that support seamless protocol switching typically use brute force methods, including, for example, removing cables, removing connections, removing network devices, applying configuration changes (e.g., disabling ports), etc. Relying on such brute force methods can be significantly time consuming, inefficient, and error prone.

Accordingly, embodiments described herein provide techniques for efficiently testing the functionality and resiliency of devices and media networks that support seamless protocol switching. More specifically, embodiments described herein provide an automatic (e.g., software driven) process where one or more network devices (e.g., IP switches) in multiple IP networks can be configured (e.g., programmed) to selectively forward traffic on a packet by packet basis within an IP media traffic flow (or stream).

Note that many of the following embodiments use media-over-IP traffic flows (or streams) as a reference type of IP media traffic flow that may be received, processed, forwarded, and/or generated by a media network having multiple independent, redundant IP networks. Note, however, that the techniques described herein for testing a media network can be used for non-media traffic flows, including, for example, financial data, weather data, telemetry, etc.

Figure 2:
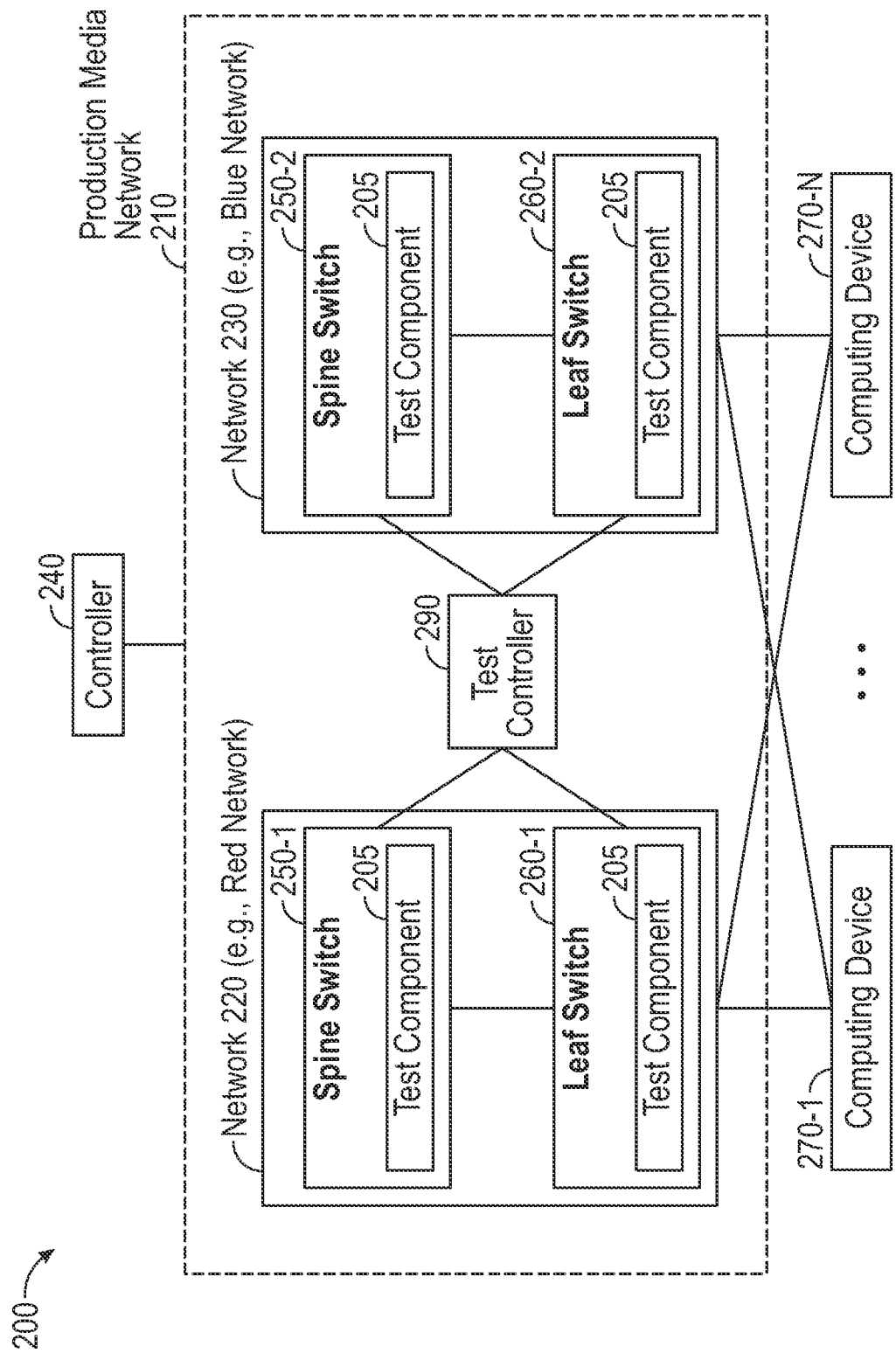
FIG. 2 illustrates an example network architecture, according to one embodiment.

FIG. 2 illustrates an example network architecture 200, according to one embodiment. The network architecture 200 includes a controller 240, a production media network (PMN) 210, and one or more computing devices 270-1 through 270-N, where N is an integer greater than one The PMN 210 is generally configured to receive, process, forward, and/or generate multicast production media traffic flows. For example, the multicast production media traffic flows can include media-over-IP multicast production media traffic flows (e.g., SMPTE standard (ST) 2110 in 1080P HD or another format).

The PMN 210 is generally configured to support latency sensitive IP traffic. Latency sensitive traffic may include traffic that is needed by the destination (e.g., one of computing devices 270-1 to 270-N) on a schedule that precludes alternative approaches to resiliency, such as detection and retransmission of lost network packets. Examples of latency sensitive IP traffic may include, but is not limited to, live streaming video, media-over-IP, multimedia teleconferencing, online gaming, etc. To support latency sensitive IP traffic, the PMN 210 may use multiple IP networks to handle the IP traffic for resiliency. Here, for example, the PMN 210 includes a network 220 (e.g., a Red network) and a network 230 (e.g., a Blue network). In one embodiment, the networks 220 and 230 are managed media-over-IP multicast networks. In a particular embodiment, the networks 220 and 230 are SMPTE ST 2110 networks that support seamless protocol switching (e.g., SMPTE 2022-7). For example, the networks 220 and 230 may be ST 2110-20 networks (e.g., supporting uncompressed video transport), ST 2110-30 networks (e.g., supporting audio-over-IP transport, based on Audio Engineering Society-67 (AES67)), ST 2110-10 networks (e.g., supporting metadata, such as system architecture and synchronization), ST 2110-22 networks (e.g., supporting constant bit-rate compressed video), etc.

The networks 220 and 230 may be independent, fully redundant IP networks. That is, the networks 220 and 230 may include the same (or similar) set of network devices (e.g., spine switches, leaf switches, or combinations thereof), may be connected to the same source(s), may be connected to the same destination(s), may include the same IP traffic, etc. Deploying fully redundant networks 220 and 230 can provide a measure of resiliency in the event one of the IP networks encounters a failure or otherwise becomes unavailable.

Each network 220 and 230 has a spine-leaf architecture. For example, the network 220 includes a spine switch 250-1 and a leaf switch 260-1. Similarly, the network 230 includes a spine switch 250-2 and a leaf switch 260-2. Spine switch 250-1, spine switch 250-2, leaf switch 260-1, and leaf switch 260-2 may be ST 2110 network devices. Although each network 220 and 230 of FIG. 2 is depicted with a single spine switch and a single leaf switch, in other implementations, the networks 220 and 230 may include any number of spine switches and any number of leaf switches. The spine layer is generally the backbone of the network and is responsible for interconnecting the leaf switches. The leaf layer generally includes access switches that connect to devices, such as microphones, cameras, video editing hardware, etc.

Each leaf switch 260-1 and leaf switch 260-2 is connected to computing devices 270-1 to 270-N. The computing devices 270-1 to 270-N are generally 2110 devices (e.g., devices that support (or operate according to) the SMPTE ST 2110 standard) and 2022-7 devices (e.g., devices that support (or operate according to) SMPTE 2022-7). Examples of 2110 and 2022-7 devices include, but are not limited to, microphones, headsets, video cameras, video editing hardware, etc.

Each computing device 270-1 to 270-N includes two NICs (e.g., two Ethernet connections), allowing the computing device to connect directly to the networks 220 and 230 of the PMN 210. Each computing device 270-1 to 270-N may be configured to transmit data via the PMN 210 using the two NICs and/or receive data via the PMN 210 using the two NICs. A computing device (e.g., computing device 270-1) that transmits two IP media traffic flows (with the same data) to another computing device (e.g., computing device 270-2) via the networks 220 and 230 of the PMN 210 may be referred to as a source. Likewise, a computing device (e.g., computing device 270-2) that is responsible for reconstructing an IP media traffic flow from data received via the networks 220 and 230 of the PMN 210 may be referred to as a destination. The leaf switch 260-1 and leaf switch 260-2 may be considered as ingress network devices to a source (e.g., computing device 270-1) and may be considered as egress network devices to a destination (e.g., computing device 270-2).

A destination may accept, on a packet-by-packet basis, an incoming packet(s) from the network 220 or the network 230, without significantly interrupting or impacting the data flow. For example, the destination may be configured to accept the next incoming packet(s) from whichever network 220 or network 230 delivers the next incoming packet(s) first. For instance, in the event network 220 fails or otherwise becomes unavailable, the destination can accept an incoming packet(s) from network 230. Similarly, in the event network 230 fails or otherwise becomes unavailable, the destination can accept an incoming packet(s) from network 220.

The controller 240 is generally responsible for managing the network devices and routing of IP traffic within the PMN 210. For example, the controller 240 may have visibility into each source and destination that is connected via the PMN 210. The controller 240 may be able to manage the routing, bandwidth, security, etc. of the IP traffic from the sources to the destinations through the PMN 210. In an exemplary embodiment, the controller 240 is a software defined network (SDN) controller.

The network architecture 200 also includes a test controller 290. The test controller 290 may be located within a control plane for the network devices (e.g., spine switch 250-1, spine switch 250-2, leaf switch 260-1, leaf switch 260-2, etc.) within the PMN 210. The functionality of the test controller 290 may be distinct and separate from the functionality of the controller 240. For example, in certain embodiments, the test controller 290 configures a respective test component 205 of one or more network devices (e.g., spine switch 250-1, spine switch 250-2, leaf switch 260-1, leaf switch 260-2, etc.) within the network architecture 200 in order to allow for testing the resiliency and functionality of the network architecture 200. Each test component 205 is generally programmable forwarding logic of the respective network device that can be used to selectively forward certain packets of an IP media traffic flow. For example, as opposed to employing brute force methods to test the functionality of the network architecture 200, an automatic (e.g., software driven) process can be used via the test component(s) 205 to put one or more of the destinations within the network architecture 200 under stress, simulating a physical test of the network architecture 200.

In one embodiment, a test component 205 of a network device (e.g., spine switch 250-1, spine switch 250-2, leaf switch 260-1, leaf switch 260-2, etc.) is configured to selectively forward certain traffic (e.g., by discarding certain other traffic) on a packet by packet basis within an IP media traffic flow. For example, the test component 205 may be configured to (i) forward "even" packets (and discard "odd" packets) of the IP media traffic flow or (ii) forward "odd" packets (and discard "even" packets) of the IP media traffic flow. By selectively forwarding traffic in this manner, the test component can simulate a "worst-case" scenario for a destination where traffic is alternating at a significantly high rate.

For example, assume a destination (e.g., computing device 270-2) supports seamless protocol switching and has (i) a first input (e.g., first NIC) coupled to a first network device (e.g. leaf switch 260-1) within the first IP network (e.g., network 220) and (ii) a second input (e.g., second NIC) coupled to a second network device (e.g., leaf switch 260-2) within the second IP network (e.g., network 230). In this example, the test component 205 of the first network device may be configured to forward "odd" packets from the first IP network to the destination and the test component 205 of the second network device may be configured to forward "even" packets from the second IP network to the destination.

In such a scenario, the destination may be put under significant stress, since it has to alternately accept incoming packets from the first IP network and the second IP network at a significantly high rate. For example, an IP high-definition (HD)/ultra HD (UHD) video stream may have a packet rate in the range of microseconds to nanoseconds, depending on the size of the packets. Thus, for an IP HD/UHD video stream, making the destination, on a packet-by-packet basis, alternate between accepting a ("odd") packet from the first IP network and accepting a ("even") packet from the second IP network may be equivalent to physically swapping cables a multiple hundred thousand times per second, a testing scenario which is not possible using conventional testing techniques. In this manner, embodiments allow for efficiently testing the functionality and resiliency of the media network, relative to conventional techniques.

Additionally or alternatively, in certain embodiments, the test component 205 of one or more network devices can be configured to allow for testing different locations along an IP path within an IP network. For example, the respective test component(s) 205 of network device(s) located near the end of IP path(s) to a destination can be configured to selectively forward certain packets, the respective test component(s) 205 of network device(s) located near the beginning of an IP path(s) to a source can be configured to selectively forward certain packets, the respective test component(s) 205 of network device(s) located in the middle of IP path(s) can be configured to selectively forward certain packets, etc. By configuring the test component(s) 205 of one or more network devices at different locations along IP path(s) to selectively forward certain IP traffic, embodiments allow for simulating a system test, in which the functionality and resiliency of different portions of a given IP network can be tested.

Additionally or alternatively, in certain embodiments, a source (e.g., computing device 270-1) can be programmed to selectively transmit different sets of packets of an IP media traffic flow via the network 220 and network 230 to a destination device (e.g., computing device 270-2) in order to test the functionality and resiliency of the media network. For example, the source may be a test equipment that has (i) a first output coupled to a first network device (e.g., leaf switch 260-1) within the first IP network (e.g., network 220) and (ii) a second output coupled to a second network device (e.g., leaf switch 260-2) within a second IP network (e.g., network 230). The source may be configured to selectively transmit certain packets (e.g., even packets) of an IP media traffic flow via the first output and certain packets (e.g., odd packets) of the IP media traffic flow via the second output to simulate a source test (e.g., testing the functionality/resiliency at the source of the media network).

Note that while FIG. 2 depicts the test component 205 being deployed within multiple network devices within the network architecture 200, one or more of the test components 205 may be selectively activated/deactivated by the test controller 290 to test different portions of the network architecture 200. For example, the test component 205 within leaf switch 260-1 and the test component 205 within leaf switch 260-2 may be activated to test the functionality of a destination (e.g., computing device 270-2) to seamlessly alternate between accepting packets from network 220 and accepting packets from network 230 under simulated stressful conditions (e.g., packet drops, network device failures, etc.). In another example, the test component 205 within one or more of the network devices within the PMN 210 (e.g., spine switch 250-1, spine switch 250-2, leaf switch 260-1, leaf switch 260-2, etc.) may be activated to test the functionality of different portions of the PMN 210. In general, the test controller 290 may activate any one of (or combination of) the test components 205 within the network architecture 200 in order to test the functionality of the network architecture 200.

Additionally, note that although FIG. 2 depicts the test controller 290 within the PMN 210, the test controller 290 may be deployed elsewhere within the network architecture 200. Similarly, while FIG. 2 depicts a single test controller 290, in certain embodiments, the network architecture 200 may include multiple test controllers. In certain embodiments, the test controller 290 may be a computing system that is directly connected to one or more of the test components 205 within the network architecture 200.

Additionally, note that the network architecture 200 depicted in FIG. 2 is provided as a reference example of a network architecture in which the techniques described herein can be implemented and that the techniques described herein can be implemented in other network architectures. For example, while FIG. 2 depicts one or more test components 205 being implemented in a spine-leaf network, in certain embodiments, the test component 205 can be used to test the functionality of other types of networks. In an exemplary embodiment, the test component 205 can be used to test a destination having connectivity to a single switch in a first path and another single switch in a second path.

Figure 3:
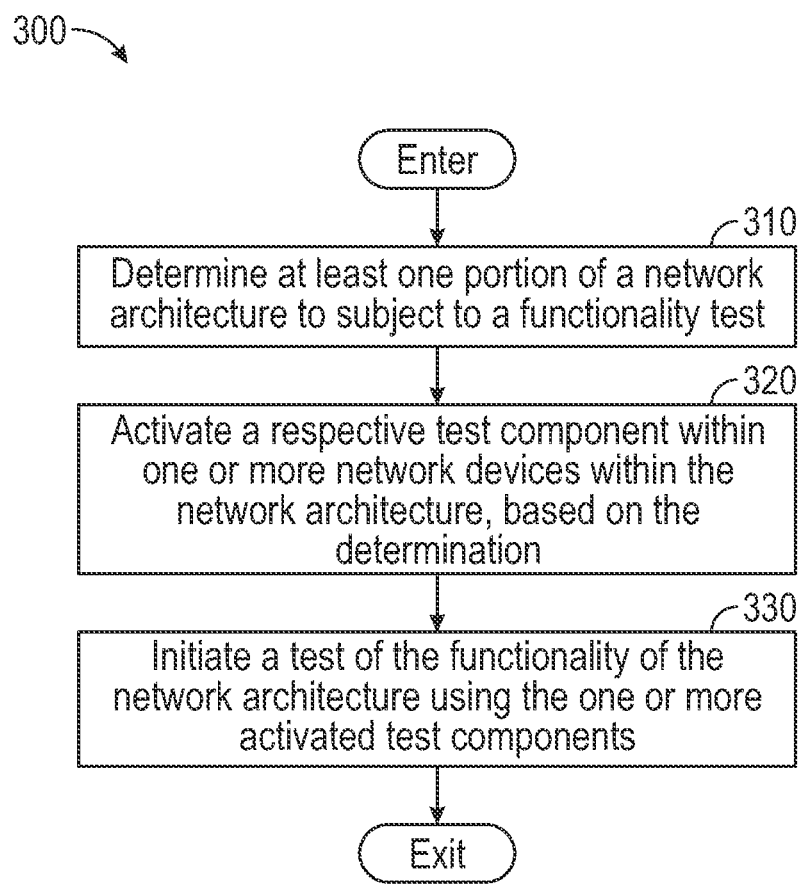
FIG. 3 is a flowchart of a method for testing the functionality of a network architecture, according to one embodiment.

FIG. 3 is a flowchart of a method 300 for testing the functionality of a network architecture (e.g., network architecture 200), according to one embodiment. The method 300 may be performed by a test controller (e.g., test controller 290).

Method 300 enters at block 310, where the test controller determines at least one portion of the network architecture to subject to a functionality test. For example, the test controller may determine the at least one portion based on an indication received from a user (e.g., administrator), based on a pre-configured testing schedule (e.g., the test controller may be pre-configured to test different portions of the network architecture at certain times/frequency), based on a command, etc. In one embodiment, the test controller may determine to test the functionality of a destination (e.g., at an end of an IP path(s) of the PMN 210). In another embodiment, the test controller may determine to test the functionality of the source of the PMN 210 (e.g., at a beginning (or ingress) of the PMN 210). In another embodiment, the test controller may determine to test the functionality of a middle portion of the PMN 210.

At block 320, the test controller activates a respective test component (e.g., test component 205) within one or more network devices (e.g., spine switch 250-1, spine switch 250-2, leaf switch 260-1, leaf switch 260-2) within the network architecture, based on the determination. For example, the test controller may activate leaf switches 260-1 and 260-2 to test the functionality of a destination (e.g., computing device 270-2). In another example, the test controller may activate leaf switches 260-1 and 260-2 coupled to a source in order to test a beginning portion of the network architecture. In another example, the test controller may activate one or more spine switches 250-1 and 250-2 in order to test a middle portion of the network architecture. In one embodiment, as part of activating a given test component, the test controller may configure the test component to selectively forward certain IP traffic that satisfies a predetermined condition.

At block 330, the test controller initiates a test of the functionality of the network architecture using the one or more activated test components.

Figure 4:
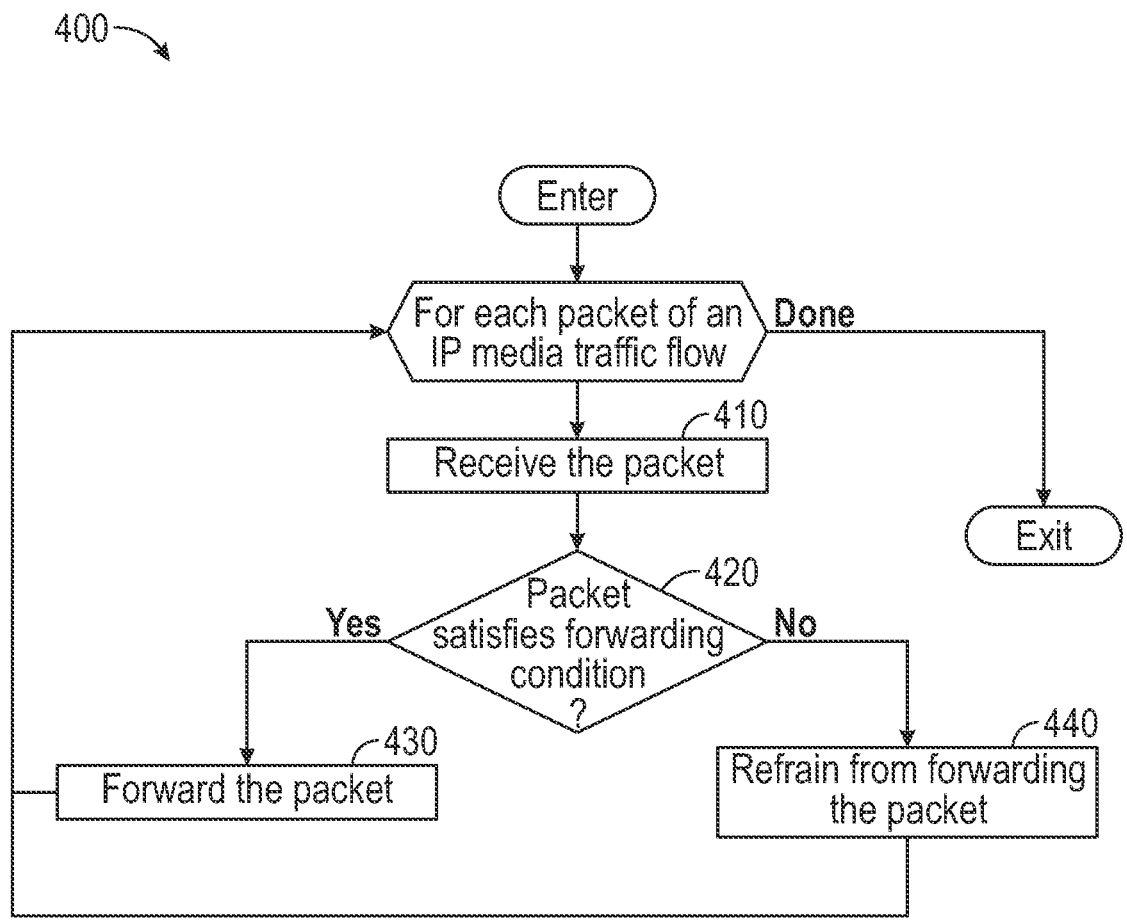
FIG. 4 is a flowchart of a method for selectively forwarding packets of an IP media traffic flow as part of testing the functionality of a network architecture, according to one embodiment.

FIG. 4 is a flowchart of a method 400 for selecting forwarding packets of an IP media traffic flow as part of testing the functionality of a network architecture (e.g., network architecture 200), according to one embodiment. The method 400 may be performed by a test component (e.g., test component 205) of a network device (e.g., spine switch 250-1, spine switch 250-2, leaf switch 260-1, leaf switch 260-2). The method 400 may be performed for each packet of the IP media traffic flow.

Method 400 enters at block 410, where the test component receives a packet of an IP media traffic flow. For example, the IP media traffic flow may be a video-over-IP traffic flow, an audio-over-IP traffic flow, metadata-over-IP traffic flow, or combinations thereof.

At block 420, the test component determines whether the packet satisfies a forwarding condition. The test component may determine the forwarding condition based on an indication or configuration from a test controller (e.g., test controller 290). In one embodiment, the forwarding condition includes the packet being an "odd" packet of a sequence of packets of the IP media traffic flow. In another embodiment, the forwarding condition includes the packet being an "even" packet of a sequence of packets of the IP media traffic flow.

Figure 5:
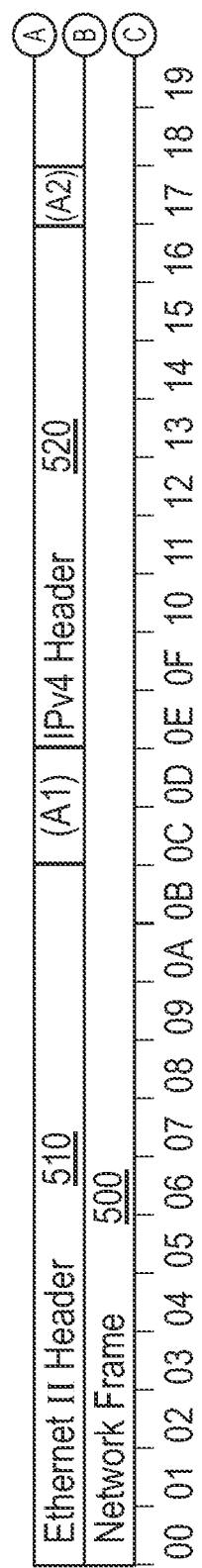
FIG. 5 illustrates an example network frame, according to one embodiment.
Figure 5:
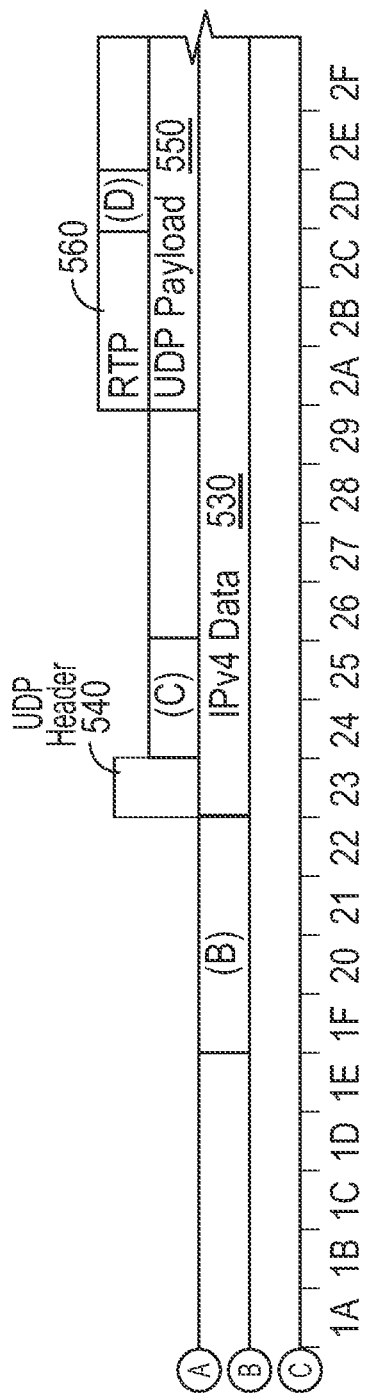

In one embodiment, the test component determines whether the packet satisfies the forwarding condition based on one or more portions of the packet (e.g., IP datagram including IP header/payload, user data protocol (UDP) datagram including UDP header/payload, Real Time Transport protocol (RTP) datagram including RTP header/payload, etc.). Briefly referring to FIG. 5, this figure depicts a portion of a network frame 500, which is representative of packet that may be received by the test component. As shown, the network frame 500 includes an Ethernet header 510, an IP header 520 (e.g., IP version 4 (IPv4) header), an IP data portion 530 (e.g., IPv4 data), a UDP header 540, a UDP payload 550, and an RTP header 560. In one embodiment, the test component may evaluate the RTP header 560 to determine whether the network frame 500 is an "odd" packet of a sequence of packets of an IP media traffic flow or an "even" packet of a sequence of packets of an IP media traffic flow. For example, as described in more detail below, the test component may determine whether the least significant bit of the (D) address (0x2D) of the network frame is set to "0" (indicating "even") or is set to "1" (indicating "odd").

Referring back to FIG. 4, if the test component determines the packet satisfies the forwarding condition, then, at block 430, the test component forwards the packet to another device (e.g., network device or computing device). On the other hand, if the test component determines the packet does not satisfy the forwarding condition, then, at block 440, the test component refrains from forwarding the packet to another device (e.g., network device or computing device). In one embodiment, refraining from forwarding the packet to another device includes discarding the packet.

Figure 6:
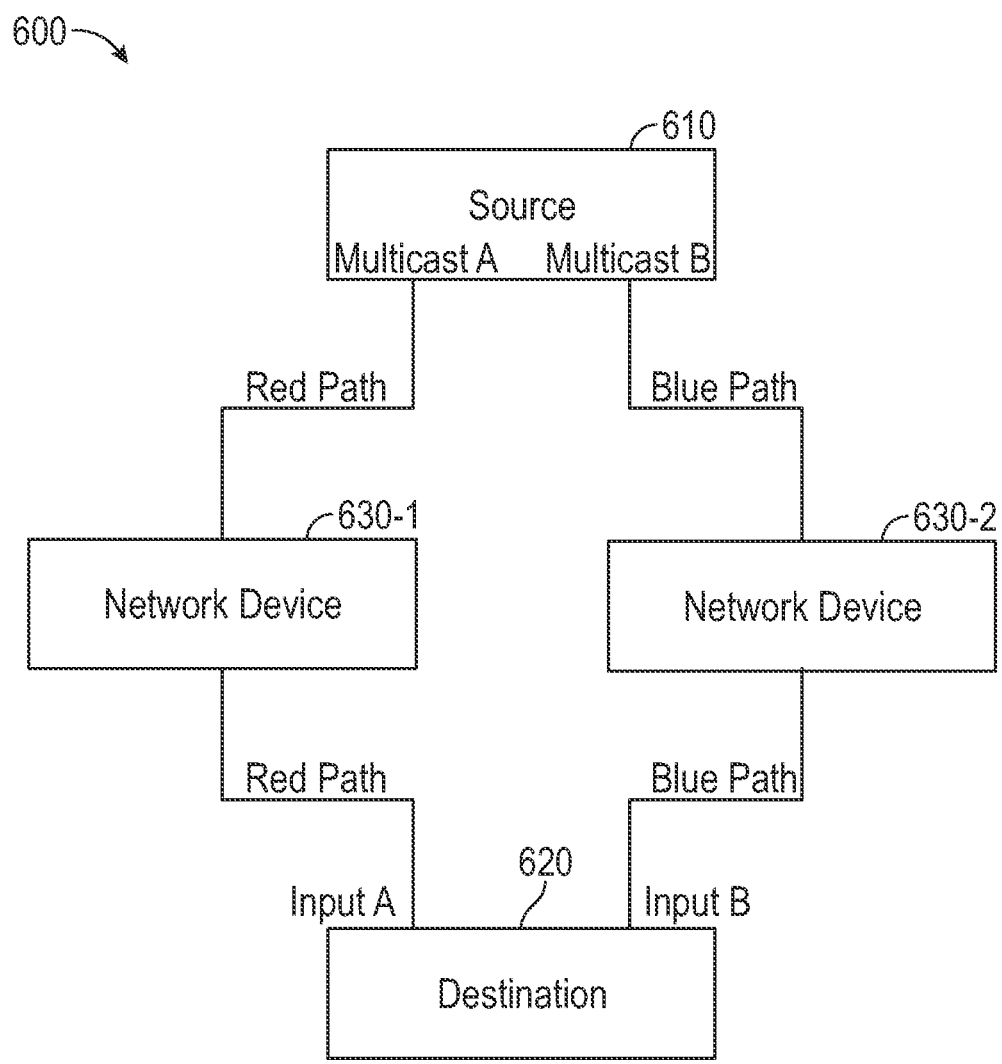
FIG. 6 illustrates an example scenario for testing the functionality of a network architecture, according to one embodiment.

Consider the reference scenario 600 depicted in FIG. 6, which depicts a source 610 and a destination 620 each coupled to a network device 630-1 and a network device 630-2. The source 610 may be representative of one of the computing devices 270 1-N depicted in FIG. 2 and the destination 620 may be representative of another one of the computing devices 270 1-N depicted in FIG. 2. Similarly, the network device 630-1 may be a spine switch (e.g., spine switch 250-1) or a leaf switch (e.g., leaf switch 260-1) within a first IP network (e.g., network 220), and the network device 630-2 may be a spine switch (e.g., spine switch 250-2) or a leaf switch (e.g., leaf switch 260-2) within a second IP network (e.g., network 230). In scenario 600, the destination 620 includes a first input (e.g., first NIC) coupled to the first IP network via network device 630-1 and a second input (e.g., second NIC) coupled to the second IP network via network device 630-2.

In normal operation, the destination 620 is generally configured to receive a first IP media traffic flow (e.g. multicast IP traffic flow A) on Input A from a first IP path (e.g., Red path) via the network device 630-1 and receive a second IP media traffic flow (e.g., multicast IP traffic flow B) on Input B from a second IP path (e.g., Blue path) via the network device 630-2, where the first IP media traffic flow contains the same media content as the second IP media traffic flow. The destination 620 is configured to listen to both Input A and Input B (e.g., at all times) for receiving and recovering the IP media traffic flow. For example, the destination 620 may obtain, on a packet-by-packet basis, the needed packet for the IP media traffic flow from whichever input (e.g., Input A or Input B) delivers the packet first. As noted, this configuration of the destination 620 enables the destination 620 to accept packets from different IP networks in the event a failure occurs within one of the IP paths.

To test the functionality of the destination 620 being able to properly accept packets from different IP networks, the network device 630-1 can be configured (via a test component 205) to selectively forward a first set of packets of the first IP media traffic flow and the network device 630-2 (via a test component 205) can be configured to selectively forward a different second set of packets of the second IP media traffic flow. The union of the first set of packets and the second set of packets may include a single copy of every packet (e.g., no duplicate packets) in the first or second IP media traffic flow. In one embodiment, the test component 205 of the network device 630-1 is configured to perform the method 700 of FIG. 7 in order to selectively forward a first set of packets of the first IP media traffic flow, and the test component 205 of the network device 630-2 is configured to perform the method 800 of FIG. 8 in order to selectively forward a second set of packets of the second IP media traffic flow. Configuring the network devices 630-1 and 630-2 to selectively forward certain packets may force the destination 620 to alternate between accepting packets from the first IP path and accepting packets from the second IP path at a significantly high rate, allowing for the functionality of the destination 620 to be tested in high stress conditions.

Figure 7:
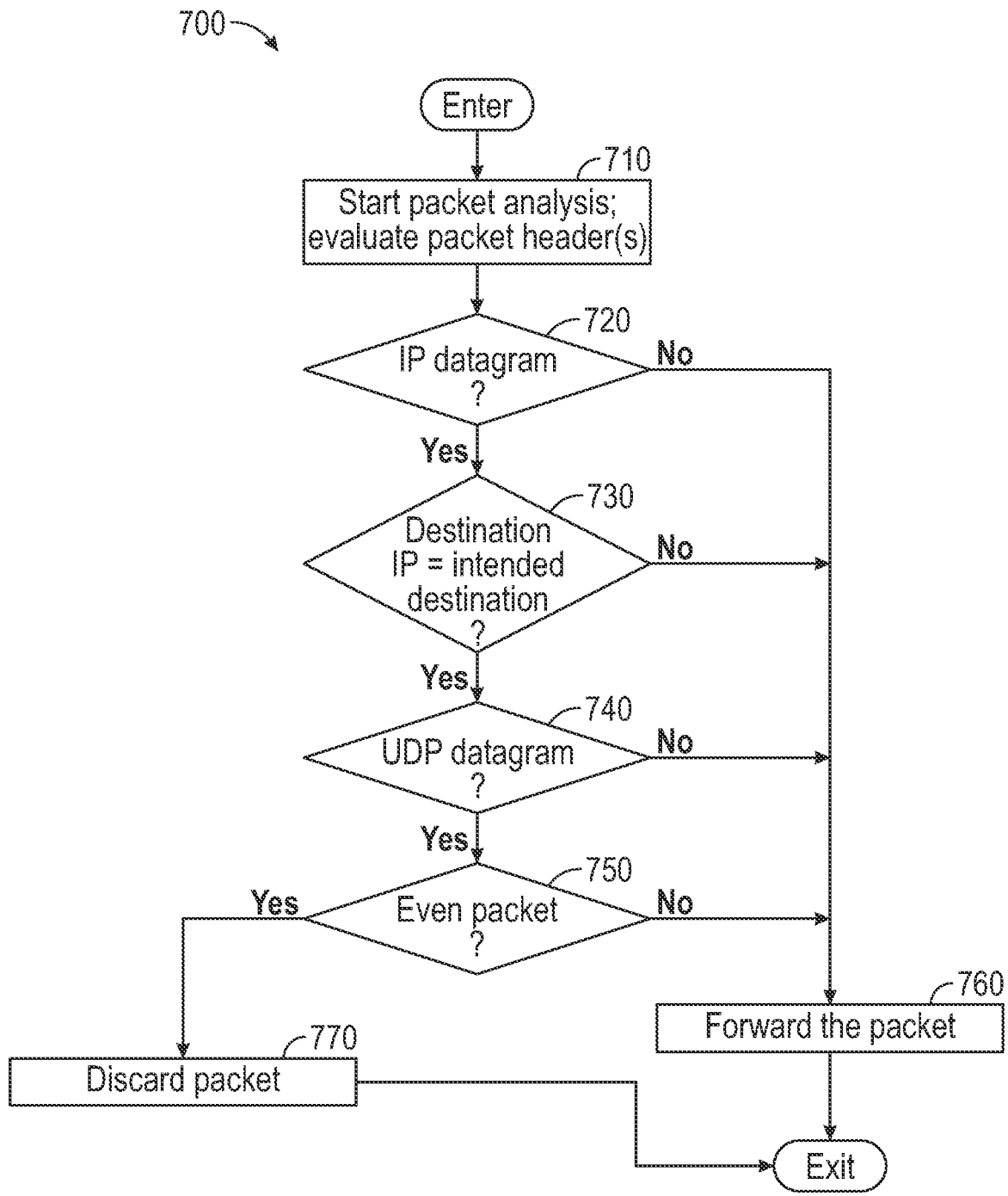
FIG. 7 is a flowchart of a method for determining whether to forward a packet of an IP media traffic flow, according to one embodiment.

FIG. 7 is a flowchart of a method 700 for determining whether to forward a packet of an IP media traffic flow, according to one embodiment. The method 700 may be performed by a test component (e.g., test component 205) of a network device (e.g., spine switch 250-1, spine switch 250-2, leaf switch 260-1, leaf switch 260-2). In a particular embodiment, the method 700 is performed by a test component of a network device configured to forward "odd" packets of an IP media traffic flow.

Method 700 enters at block 710, where the test component starts or initiates a packet analysis of a packet of a sequence of packets received by the network device. For example, the test component may evaluate one or more headers of the packet (e.g., IP header, UDP header, RTP header, etc.). In certain embodiments, one or more of the blocks 710, 720, 730, and 740, and 750 in method 700 are performed concurrently (e.g., in a single decision).

At block 720, the test component determines whether the packet includes an IP datagram (e.g., IP header and IP payload). Assuming the packet is the network frame 500 depicted in FIG. 5, the test component may evaluate the (A1) address 0x0C, 0x0D of the packet to determine whether the packet includes an IP datagram. In one example, if the (A1) address is equal to a first predefined value (e.g., 0x08, 0x00), then the test component may determine that the packet includes an IP datagram. On the other hand, if the (A1) address is not equal to the first predefined value (0x08, 0x00), then the test component may determine that the packet does not include an IP datagram.

If, at block 720, the test component determines the packet does not include an IP datagram, then, at block 760, the test component may forward the packet. On the other hand, if, at block 720, the test component determines the packet does include an IP datagram, then the method proceeds to block 730. At block 730, the test component determines whether the destination IP address (within the IP datagram) is the address of the intended destination (e.g., destination 620). If, at block 730, the test component determines the destination IP address is not the address of the intended destination, then the method proceeds to block 760. On the other hand, if, at block 730, the test component determines the destination IP address is the address of the intended destination, then the method proceeds to block 740. At block 740, the test component determines whether the packet includes a UDP datagram (e.g., UDP header and UDP payload). Assuming the packet is the network frame 500 depicted in FIG. 5, the test component may evaluate the (A2) address 0x17 of the packet to determine whether the packet includes a UDP datagram. In one example, if the (A2) address is equal to a second predefined value (e.g., 0x11), then the test component may determine that the packet includes a UDP datagram. On the other hand, if the (A2) address is not equal to the second predefined value (0x11), then the test component may determine that the packet does not include a UDP datagram.

If, at block 740, the test component determines the packet does not include a UDP datagram, then the method proceeds to block 760. On the other hand, if, at block 740, the test component determines the packet does include a UDP datagram, then the method proceeds to block 750. At block 750, the test component determines whether the packet is an "even" packet of the sequence of packets. Assuming the packet is the network frame 500 depicted in FIG. 5, the test component may evaluate the LSB of the (D) address 0x2D (e.g. within the RTP header) of the packet to determine whether the packet is an "even" packet of the sequence of packets. In one example, if the LSB of the (D) address is equal to a third predefined value (e.g., "0"), then the test component may determine that the packet is an "even" packet. On the other hand, if the LSB of the (D) address is not equal to the third predefined value (e.g., LSB of the (D) address is equal to "1"), then the test component may determine that the packet is an "odd" packet.

If, at block 750, the test component determines the packet is an "even" packet, then the test component, at block 770, discards the packet. On the other hand, if, at block 750, the test component determines the packet is not an "even" packet (i.e., determines the packet is an "odd" packet), then the method proceeds to block 760. In this manner, the test component of a network device along an IP path of an IP network (e.g., Red Network) may selectively forward packets of the IP media traffic flow according to a predefined criteria.

Figure 8:
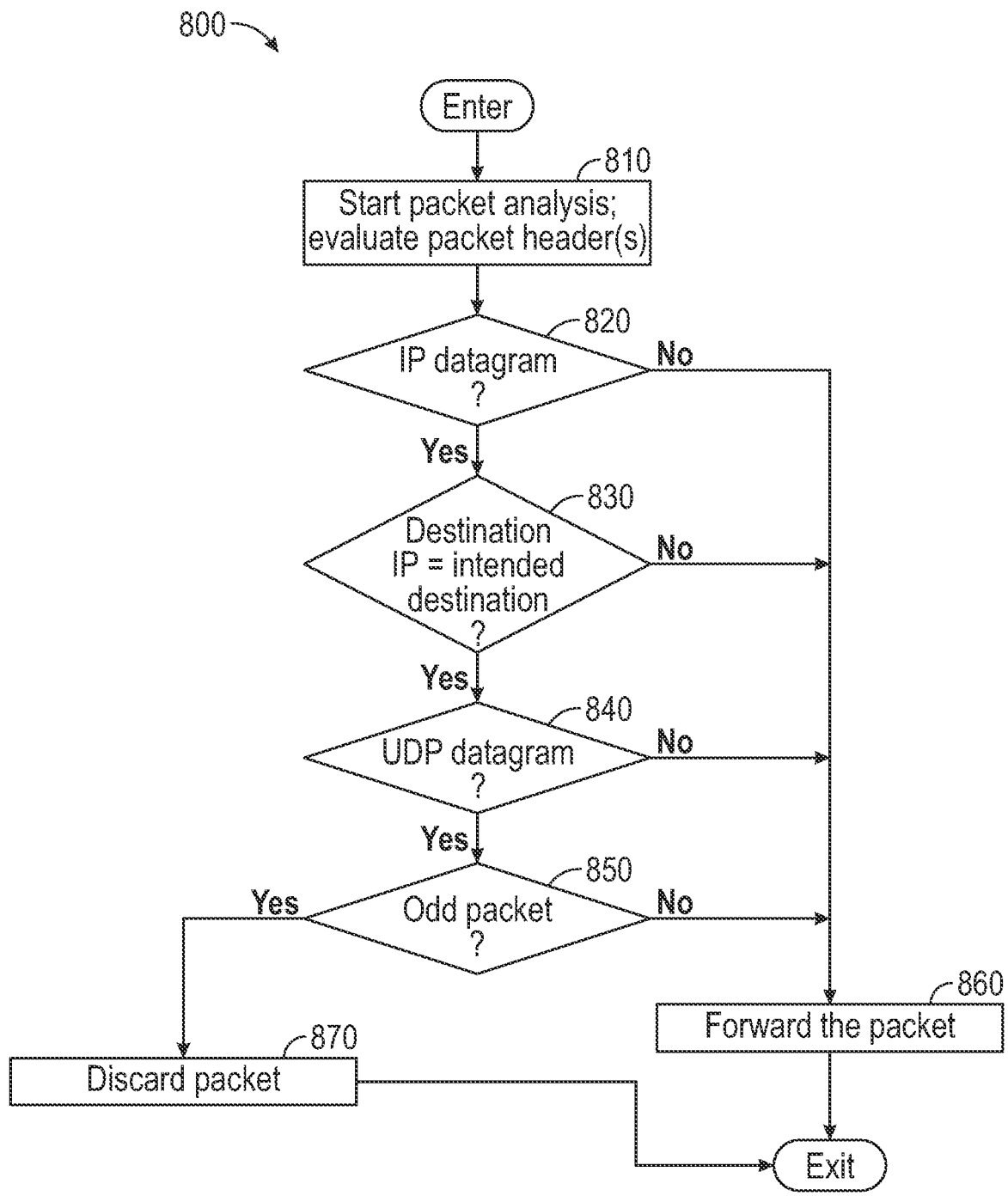
FIG. 8 is a flowchart of another method for determining whether to forward a packet of an IP media traffic flow, according to one embodiment.

FIG. 8 is a flowchart of another method 800 for determining whether to forward a packet of an IP media traffic flow, according to one embodiment. The method 800 may be performed by a test component (e.g., test component 205) of a network device (e.g., spine switch 250-1, spine switch 250-2, leaf switch 260-1, leaf switch 260-2). In a particular embodiment, the method 800 is performed by a test component of a network device configured to forward "even" packets of an IP media traffic flow.

Method 800 enters at block 810, where the test component starts or initiates a packet analysis of a packet of a sequence of packets received by the network device. For example, the test component may evaluate one or more headers of the packet (e.g., IP header, UDP header, RTP header, etc.). In certain embodiments, one or more of the blocks 810, 820, 830, and 840, and 850 in method 800 are performed concurrently (e.g., in a single decision).

At block 820, the test component determines whether the packet includes an IP datagram (e.g., IP header and IP payload). Assuming the packet is the network frame 500 depicted in FIG. 5, the test component may evaluate the (A1) address 0x0C, 0x0D of the packet to determine whether the packet includes an IP datagram. In one example, if the (A1) address is equal to a first predefined value (e.g., 0x08, 0x00), then the test component may determine that the packet includes an IP datagram. On the other hand, if the (A1) address is not equal to the first predefined value (0x08, 0x00), then the test component may determine that the packet does not include an IP datagram.

If, at block 820, the test component determines the packet does not include an IP datagram, then, at block 860, the test component may forward the packet. On the other hand, if, at block 820, the test component determines the packet does include an IP datagram, then the method proceeds to block 830. At block 830, the test component determines whether the destination IP address (within the IP datagram) is the address of the intended destination (e.g., destination 620). If, at block 830, the test component determines the destination IP address is not the address of the intended destination, then the method proceeds to block 860. On the other hand, if, at block 830, the test component determines the destination IP address is the address of the intended destination, then the method proceeds to block 840. At block 840, the test component determines whether the packet includes a UDP datagram (e.g., UDP header and UDP payload). Assuming the packet is the network frame 500 depicted in FIG. 5, the test component may evaluate the (A2) address 0x17 of the packet to determine whether the packet includes a UDP datagram. In one example, if the (A2) address is equal to a second predefined value (e.g., 0x11), then the test component may determine that the packet includes a UDP datagram. On the other hand, if the (A2) address is not equal to the second predefined value (0x11), then the test component may determine that the packet does not include a UDP datagram.

If, at block 840, the test component determines the packet does not include a UDP datagram, then the method proceeds to block 860. On the other hand, if, at block 840, the test component determines the packet does include a UDP datagram, then the method proceeds to block 850. At block 850, the test component determines whether the packet is an "odd" packet of the sequence of packets. Assuming the packet is the network frame 500 depicted in FIG. 5, the test component may evaluate the LSB of the (D) address 0x2D (e.g. within the RTP header) of the packet to determine whether the packet is an "odd" packet of the sequence of packets. In one example, if the LSB of the (D) address is equal to a third predefined value (e.g., "0"), then the test component may determine that the packet is an "even" packet. On the other hand, if the LSB of the (D) address is not equal to the third predefined value (e.g., LSB of the (D) address is equal to "1"), then the test component may determine that the packet is an "odd" packet.

If, at block 850, the test component determines the packet is an "odd" packet, then the test component, at block 870, discards the packet. On the other hand, if, at block 850, the test component determines the packet is not an "odd" packet (i.e., determines the packet is an "even" packet), then the method proceeds to block 860. In this manner, the test component of a network device along an IP path of an IP network (e.g., Blue Network) may selectively forward packets of the IP media traffic flow according to a predefined criteria.

Figure 9:
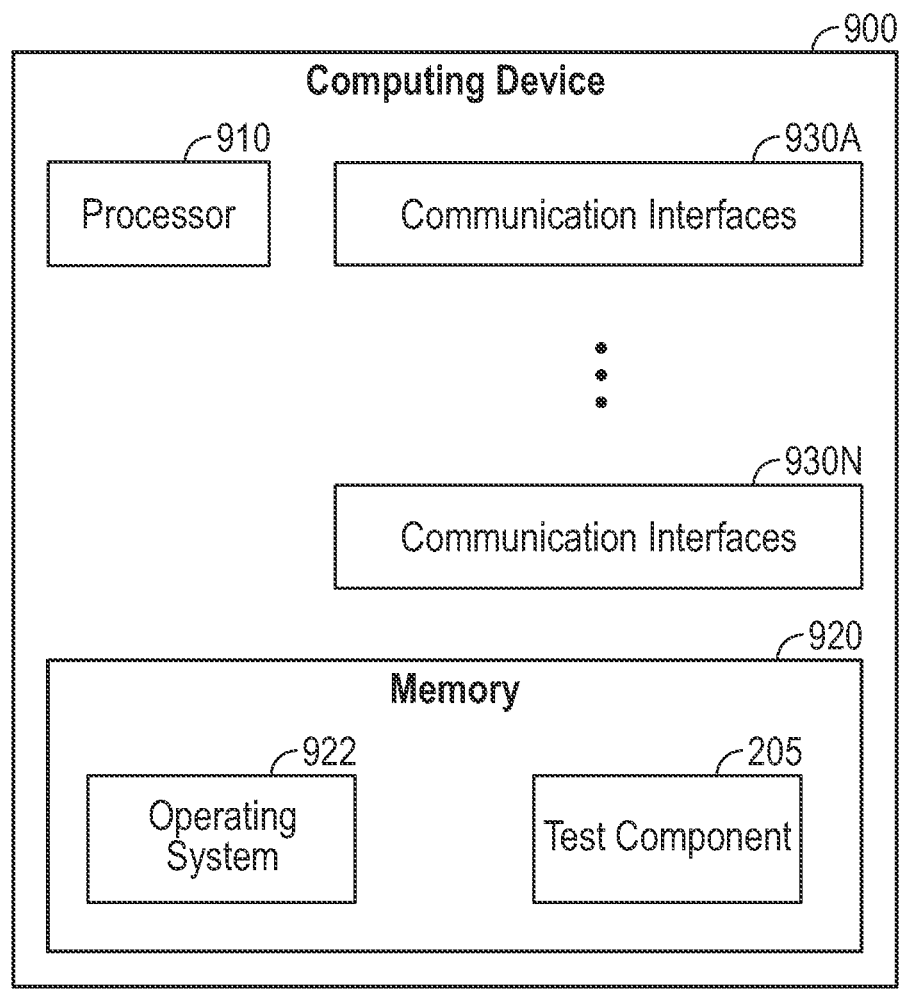
FIG. 9 illustrates an example computing device, according to one embodiment.

FIG. 9 illustrates an example computing device 900, according to one embodiment. The computing device 900 may be a leaf switch (e.g., leaf switch 260-1, leaf switch 260-2), a spine switch (e.g., spine switch 250-1, spine switch 250-2), a destination (e.g., computing device 270-2), a source (e.g., computing device 270-1), a test equipment (e.g., computing device 270-1), etc. The computing device 900 includes a processor 910, a memory 920, and one or more communication interfaces 930A to 930N (generally, communication interface 930).

The processor 910 may be any processing element capable of performing the functions described herein. The processor 910 represents a single processor, multiple processors, a processor with multiple cores, and combinations thereof. The communication interfaces 930 facilitate communications between the computing device 900 and other devices. The communications interfaces 930 are representative of wireless communications antennas and various wired communication ports. The memory 920 may be either volatile or non-volatile memory and may include RAM, flash, cache, disk drives, and other computer readable memory storage devices. Although shown as a single entity, the memory 920 may be divided into different memory storage elements such as RAM and one or more hard disk drives.

As shown, the memory 920 includes various instructions that are executable by the processor 910 to provide an operating system 922 to manage various functions of the computing device 900. As shown, the memory 920 includes an operation system 922 and a test component 205, which is described in greater detail herein.

Figure 10:
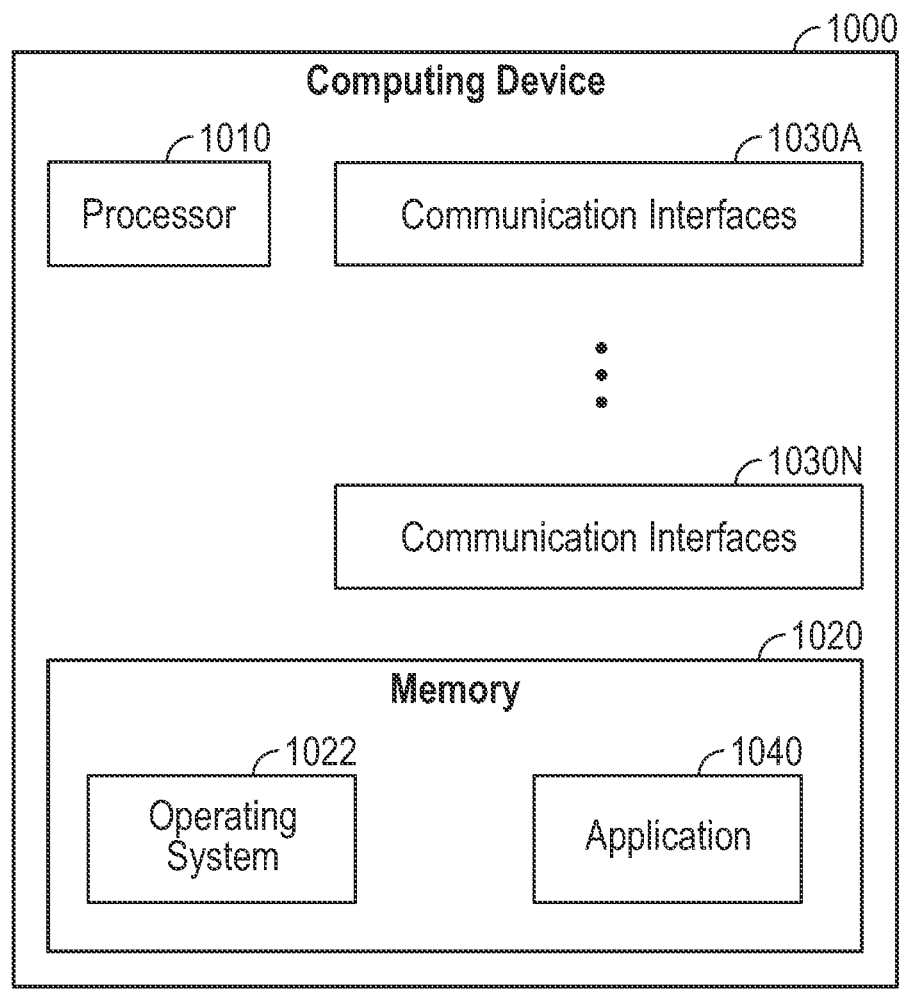
FIG. 10 illustrates an example computing device, according to one embodiment.

FIG. 10 illustrates an example computing device 1000, according to one embodiment. The computing device 1000 may be a test controller (e.g., test controller 290). The computing device 1000 includes a processor 1010, a memory 1020, and one or more communication interfaces 1030A to 1030N (generally, communication interface 1030).

In various embodiments, the computing device 1000 may represent a user device, a server, or any other computing device connected to or part of the network architecture 200. The processor 1010 may be any processing element capable of performing the functions described herein. The processor 1010 represents a single processor, multiple processors, a processor with multiple cores, and combinations thereof. The communication interfaces 1030 facilitate communications between the computing device 1000 and other devices. The communications interfaces 1030 are representative of wireless communications antennas and various wired communication ports. The memory 1020 may be either volatile or non-volatile memory and may include RAM, flash, cache, disk drives, and other computer readable memory storage devices. Although shown as a single entity, the memory 1020 may be divided into different memory storage elements such as RAM and one or more hard disk drives.

As shown, the memory 1020 includes various instructions that are executable by the processor 1010 to provide an operating system 1022 to manage various functions of the computing device 1000. As shown, the memory 1020 includes an operation system 1022 and an application 1040, which is configured to implement one or more techniques described herein for testing the functionality of a network architecture (e.g., network architecture 200).

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system for testing a functionality of a media network comprising:
   a first internet protocol (IP) network comprising a first network device having a normal operation and a test operation;
   a second IP network comprising a second network device having the normal operation and the test operation;
   a first computing device coupled to the first IP network via the first network device and to the second IP network via the second network device; and
   a second computing device coupled to the first IP network via the first network device and to the second IP network via the second network device;
   wherein when the first network device and the second network device are both in the normal operation:
      the first network device is configured to receive a first plurality of packets of an IP media traffic flow from the first computing device and forward the first plurality of packets to the second computing device; and
      the second network device is configured to receive the first plurality of packets of the IP media traffic flow from the first computing device and forward the first plurality of packets to the second computing device; and
   wherein when the first network device and the second network device are both in the test operation:
      the first network device is configured to receive a second plurality of packets of the IP media traffic flow from the first computing device and selectively discard one or more of the second plurality of packets, and forward the second plurality of packets other than the one or more of the second plurality of packets to the second computing device; and
      the second network device is configured to receive the second plurality of packets of the IP media traffic flow from the first computing device and selectively discard the second plurality of packets other than the one or more of the second plurality of packets, and forward the one or more of the second plurality of packets to the second computing device.

2. The system of claim 1, wherein discarding the one or more of the second plurality of packets discards odd packets of the second plurality of packets or discards even packets of the second plurality of packets.

3. The system of claim 1, wherein:
   the first network device is configured to determine the one or more of the second packets comprise a real time protocol (RTP) header; and
   the first network device is configured to determine the one or more of the second packets are to be discarded based on a portion of the RTP header.

4. The system of claim 3, wherein the portion of the RTP header comprises a least significant bit of a byte of an address within the RTP header.

5. The system of claim 1, wherein:
   the second network device is configured to determine the one or more of the second packets comprise a real time protocol (RTP) header; and
   the second network device is configured to determine the one or more of the second packets are to be discarded based on a portion of the RTP header.

6. The system of claim 5, wherein the portion of the RTP header comprises a least significant bit of a byte of an address within the RTP header.

7. The system of claim 1, wherein when the first network device and the second network device are both in the normal operation, the first IP network is redundant to the second IP network.

8. The system of claim 1, wherein the IP media traffic flow comprises at least one of video, audio, or metadata.

9. A computer-implemented method performed by a controller in a system comprising a first internet protocol (IP) network including a first network device having a normal operation and a test operation, a second IP network including a second network device having the normal operation and the test operation, a first computing device coupled to the first IP network via the first network device and to the second IP network via the second network device, and a second computing device coupled to the first IP network via the first network device and to the second IP network via the second network device, the computer-implemented method comprising:
   in response to configuring the first network device and the second network device both in the normal operation:
      receiving, by the first network device, a first plurality of packets of an IP media traffic flow from the first computing device and forwarding the first plurality of packets to the second computing device; and
      receiving, by the second network device, the first plurality of packets of the IP media traffic flow from the first computing device and forward the first plurality of packets to the second computing device; and
   in response to configuring the first network device and the second network device both in the test operation:
      receiving, by the first network device, a second plurality of packets of the IP media traffic flow from the first computing device and selectively discard one or more of the second plurality of packets, and forwarding the second plurality of packets other than the one or more of the second plurality of packets to the second computing device; and
      receiving, by the second network device, the second plurality of packets of the IP media traffic flow from the first computing device and selectively discard the second plurality of packets other than the one or more of the second plurality of packets, and forwarding the one or more of the second plurality of packets to the second computing device.

10. The computer-implemented method of claim 9, wherein discarding the one or more of the second plurality of packets discards odd packets of the second plurality of packets or discards even packets of the second plurality of packets.

11. The computer-implemented method of claim 9, further comprising:

determining, by the first network device, the one or more of the second first packets comprise a real time protocol (RTP) header; and determining, by the first network device, the one or more of the second packets are to be discarded based on a portion of the RTP header.

12. The computer-implemented method of claim 11, wherein the portion of the RTP header comprises a least significant bit of a byte of an address within the RTP header.

13. The computer-implemented method of claim 9, further comprising:

determining, by the second network device, the one or more of the second packets comprise a real time protocol (RTP) header; and determining, by the second network device, the one or more of the second first packets are to be discarded based on a portion of the RTP header.

14. The computer-implemented method of claim 13, wherein the portion of the RTP header comprises a least significant bit of a byte of an address within the RTP header.

15. The computer-implemented method of claim 9, wherein when the first network device and the second network device are both in the normal operation, the first IP network is redundant to the second IP network.

16. The computer-implemented method of claim 9, wherein the IP media traffic flow comprises at least one of video, audio, or metadata.

\* \* \* \* \*